United States Patent
Hanni

(10) Patent No.: US 12,095,600 B1
(45) Date of Patent: Sep. 17, 2024

(54) WAVEFORM CREATION FOR RF DISTORTION ANALYSIS AND GAIN COMPRESSION CHARACTERIZATION

(71) Applicant: Keysight Technologies, Inc., Santa Rosa, CA (US)

(72) Inventor: Mark Hanni, Colorado Springs, CO (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 17/971,317

(22) Filed: Oct. 21, 2022

(51) Int. Cl.
*H04L 27/00* (2006.01)
*H04L 27/36* (2006.01)

(52) U.S. Cl.
CPC .......... *H04L 27/0012* (2013.01); *H04L 27/36* (2013.01)

(58) Field of Classification Search
CPC .......................... H04L 27/0012; H04L 27/36
See application file for complete search history.

(56) References Cited

U.S. PATENT DOCUMENTS

| 9,554,291 B2 | 1/2017 | Smith |
| 2010/0228515 A1 | 9/2010 | Srinivasan et al. |

*Primary Examiner* — Nader Bolourchi

(57) ABSTRACT

A system includes a memory that stores instructions; and a processor. When executed by the processor, the instructions cause the system to: obtain inputs including a number of steps, a size of the steps, a duration of the steps, and a waveform sample rate; reconcile the duration of the steps against the waveform sample rate to ensure a number of samples per step is an integer number; compute a list of power levels based on the number of steps and the size of the steps; convert the list of power levels to a list of voltage levels; create a first array for I data based on the voltage levels; create a second array for Q data so that a length of the first array matches a length of the second array; and combine the first array and the second array to create an IQ baseband waveform data array.

19 Claims, 12 Drawing Sheets

WAVEFORM CREATION FOR RF DISTORTION ANALYSIS AND GAIN COMPRESSION CHARACTERIZATION

BACKGROUND

Modern demands for wireless communication applications have resulted in usage of increasingly higher frequencies of the radio frequency (RF) spectrum. The usage of increasingly higher frequencies facilitates higher data bandwidths and speeds. These communication applications have precipitated development of an entire class of commercial component devices that can be described as digital-to-RF data converting devices and/or RF-to-digital data converting devices. These data converting devices may include a single component with an RF input and digital output using an analog-to-digital converter (ADC) and/or an RF output and digital input using a digital-to-analog converter (DAC). These cross-domain devices have gained commercial popularity, and may include, for example, RF and digital components of a transceiver chip integrated into a single package. The advancements of communication applications at higher frequencies results in a need for closer integration of the digital components and RF components of devices in order to achieve required performance metrics.

Digital-RF converting devices have a combination of RF front end and a digital baseband back end. These types of digital-RF converting devices are devices that integrate RF components with digital components as a combined RF-digital system. These systems can be used for receiving RF signals and converting the received signal to a digital representation and/or transmitting a RF waveform based on a digital description of the waveform.

With the reduction in component size, digital-RF data converting devices are not easily characterized using traditional vector network analyzer (VNA) methods. Whereas digital-RF converting devices for transmitters or receivers may have only a single RF input connection point or output connection point and a single digital input connection point or output connection point, digital-RF transceivers combine both the receiving and transmitting into a single package with a common digital input/output interface point and both an RF receiver input and an RF transmitter output. However, there is no current mechanism for VNAs or similar test equipment to characterize either digital-RF converting devices or digital-RF transceivers.

Characterization of modulation distortion parameters is important to understand how digital-RF converting devices and digital-RF transceivers perform under modulated conditions. It is also important to characterize how these devices perform when operated at or around the point of compression. However, digital-RF converting devices and digital-RF transceivers have integrated digital or analog amplification and attenuation capabilities. The digital-RF converting devices and digital-RF transceivers are compact devices that directly mate the RF front-end components with the digital baseband back-end components in a single chip. Traditional VNA measurement techniques are difficult to use with these devices as such measurement techniques typically rely on having access to both RF input connection points and RF output connection points, and are able to measure the response of a DUT relative to stimulus from the VNA in the RF domain. Such measurements are not currently feasible for digital-RF receiver devices given the absence of access to both RF input and RF output connection points as well as the inability to continuously sample the input or output RF stimulus or response in the system.

Accordingly, new measurement mechanisms must be developed for digital-RF converting devices and digital-RF transceivers that do not rely on simultaneous acquisition of an RF response to a known RF stimulus.

SUMMARY

According to an aspect of the present disclosure, a system includes a memory that stores instructions; and a processor that executes the instructions. When executed by the processor, the instructions cause the system to: obtain inputs including a number of steps, a size of the steps, a duration of the steps, and a waveform sample rate; reconcile the duration of the steps against the waveform sample rate to ensure a number of samples per step is an integer number; compute a list of power levels based on the number of steps and the size of the steps; convert the list of power levels to a list of voltage levels; create a first array for I data based on the voltage levels; create a second array for Q data so that a length of the first array matches a length of the second array; and combine the first array and the second array to create an IQ baseband waveform data array.

According to another aspect of the present disclosure, a method is performed by a system comprising a memory that stores instructions and a processor that executes the instructions. The method includes receiving inputs including a number of steps, a size of the steps, a duration of the steps, and a waveform sample rate; reconciling the duration of the steps against the waveform sample rate to ensure a number of samples per step is an integer number; computing a list of power levels based on the number of steps and the size of the steps; converting the list of power levels to a list of voltage levels; creating a first array for I data based on the voltage levels; creating a second array for Q data so that a length of the first array matches a length of the second array; and combining the first array and the second array to create an IQ baseband waveform data array.

According to another aspect of the present disclosure, a tangible non-transitory computer-readable storage medium stores a computer program. The computer program, when executed by a processor, causes a system to: obtain inputs including a number of steps, a size of the steps, a duration of the steps, and a waveform sample rate; reconcile the duration of the steps against the waveform sample rate to ensure a number of samples per step is an integer number; compute a list of power levels based on the number of steps and the size of the steps; convert the list of power levels to a list of voltage levels; create a first array for I data based on the voltage levels; create a second array for Q data so that a length of the first array matches a length of the second array; and combine the first array and the second array to create an IQ baseband waveform data array.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

Figure 1:
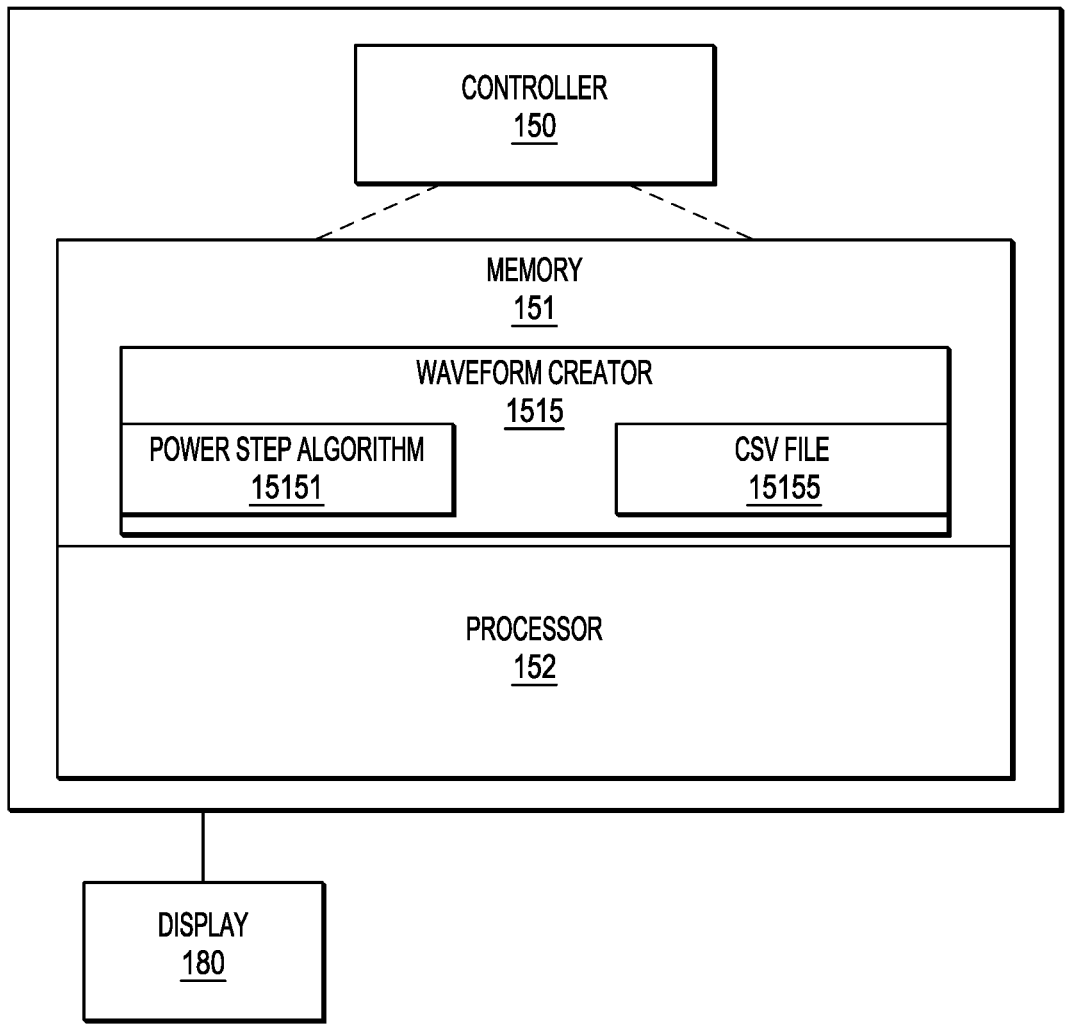
FIG. 1 illustrates a system for waveform creation for RF distortion analysis and gain compression characterization, in accordance with a representative embodiment.

In the following detailed description, for the purposes of explanation and not limitation, representative embodiments disclosing specific details are set forth in order to provide a thorough understanding of embodiments according to the present teachings. However, other embodiments consistent with the present disclosure that depart from specific details disclosed herein remain within the scope of the appended claims. Descriptions of known systems, devices, materials, methods of operation and methods of manufacture may be omitted so as to avoid obscuring the description of the representative embodiments. Nonetheless, systems, devices, materials and methods that are within the purview of one of ordinary skill in the art are within the scope of the present teachings and may be used in accordance with the representative embodiments. It is to be understood that the terminology used herein is for purposes of describing particular embodiments only and is not intended to be limiting. Definitions and explanations for terms herein are in addition to the technical and scientific meanings of the terms as commonly understood and accepted in the technical field of the present teachings.

It will be understood that, although the terms first, second, third etc. may be used herein to describe various elements or components, these elements or components should not be limited by these terms. These terms are only used to distinguish one element or component from another element or component. Thus, a first element or component discussed below could be termed a second element or component without departing from the teachings of the inventive concept.

As used in the specification and appended claims, the singular forms of terms 'a', 'an' and 'the' are intended to include both singular and plural forms, unless the context clearly dictates otherwise. Additionally, the terms "comprises", and/or "comprising," and/or similar terms when used in this specification, specify the presence of stated features, elements, and/or components, but do not preclude the presence or addition of one or more other features, elements, components, and/or groups thereof. As used herein, the term "and/or" includes any and all combinations of one or more of the associated listed items.

The present disclosure, through one or more of its various aspects, embodiments and/or specific features or sub-components, is thus intended to bring out one or more of the advantages as specifically noted below.

Waveforms created by systems and methods described herein may be used to characterize gain compression characteristics of a device under test or phase compression characteristics of a device under test. For example, the waveforms may be used to characterize behavior exhibited by digital-RF converting devices and digital-RF transceivers with RF components and digital interfaces. The waveforms described herein provide an ability to drive cross-domain devices into compression utilizing an IQ waveform. The systems used to create the waveforms described herein may be computers such as a 64-bit computer running Windows 10, and the waveforms may be used in testing of devices under test (DUTs) by signal analysis devices such as vector network analyzers (VNAs). The DUTs may be representative of cell phones such as smart phones, as well as other types of communication devices and components of such cell phones and other types of communication devices.

FIG. 1 illustrates a system 100 for waveform creation for RF distortion analysis and gain compression characterization, in accordance with a representative embodiment.

Figure 9:
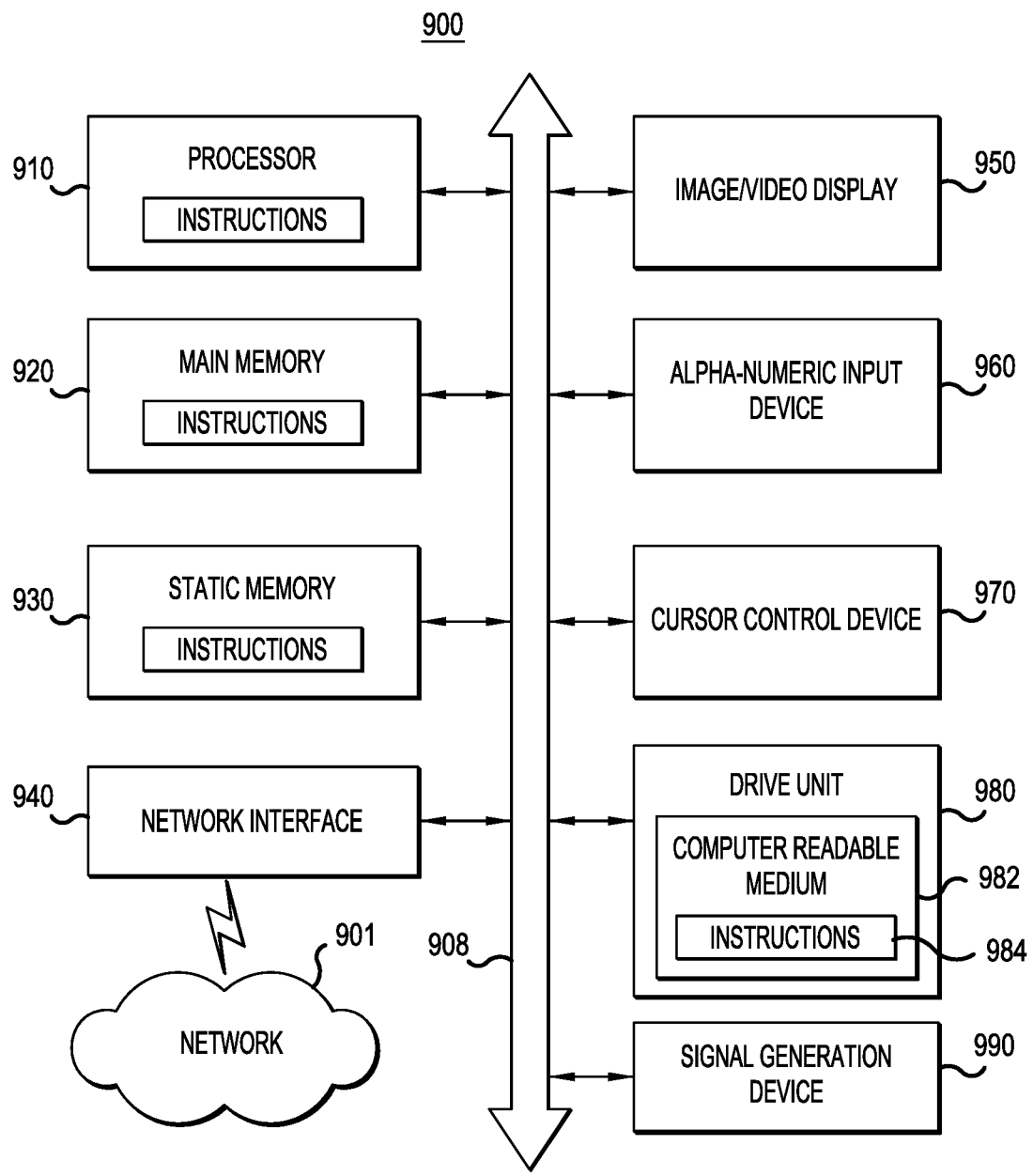
FIG. 9 illustrates a computer system, on which a method for waveform creation for RF distortion analysis and gain compression characterization is implemented, in accordance with another representative embodiment.

The system 100 in FIG. 1 includes a controller 150 and a display 180. The controller 150 includes a memory 151 and a processor 152. The memory 151 stores a waveform creator 1515. The waveform creator 1515 includes a power step algorithm 15151 and a comma-separated values (CSV) file 15155. The memory 151 also stores instructions in addition to the waveform creator 1515. The processor 152 executes the instructions. A computer that can be used to implement the system 100 is depicted in FIG. 9, though the system 100 may include more elements than depicted in FIG. 1 or FIG. 9 or fewer elements than depicted in FIG. 9.

The controller 150 may also include interfaces, such as a first interface, a second interface, a third interface, and a fourth interface. One or more of the interfaces may include ports, disk drives, wireless antennas, or other types of receiver circuitry that connect the controller 150 to other electronic elements. One or more of the interfaces may include user interfaces such as buttons, keys, a mouse, a microphone, a speaker, a display separate from the display 180, or other elements that users can use to interact with the controller 150 such as to enter instructions and receive output. The controller 150 may perform some of the operations described herein directly and may implement other operations described herein indirectly. For example, the controller 150 may indirectly control operations such as by generating and transmitting content to be displayed on the display 180. The controller 150 may directly control other operations such as logical operations performed by the processor 152 executing instructions from the memory 151 based on input received from electronic elements and/or users via the interfaces. Accordingly, the processes implemented by the controller 150 when the processor 152 executes instructions from the memory 151 may include steps not directly performed by the controller 150.

The waveform creator 151S is representative of a utility application developed to quickly and easily generate waveforms that can be used with measurement techniques to enable the characterization of the distortion properties of RF-digital receiver, transmitter, and transceiver devices. The waveform creator 151S is used to create IQ waveforms that have characteristics of a continuous waveform tone that is changing amplitude in time in a stepwise fashion. The IQ waveforms created by the waveform creator 151S enable techniques that can be used to characterize simple gain compression characteristics of RF-digital devices using coherent spectral analysis techniques. The gain and phase compression measurements made using these techniques correlate to results made using vector network analyzer gain compression measurement techniques.

The display 180 may be connected to the controller 150 via a local wired interface. The display 180 and/or one or more other element(s) of the system 100 may be interfaced with other user input devices by which users can input instructions, including mouses, keyboards, thumbwheels and so on. The display 180 may also include an interactive touch screen configured to display prompts to users and collect touch input from users.

When executed by the processor 152, the waveform creator 151S from the memory 151 causes the system 100 to: obtain inputs including a number of steps, a size of the steps, a duration of the steps, and a waveform sample rate; reconcile the duration of the steps against the waveform sample rate to ensure a number of samples per step is an integer number; compute a list of power levels based on the number of steps and the size of the steps; convert the list of power levels to a list of voltage levels; create a first array for I data based on the voltage levels; create a second array for Q data so that a length of the first array matches a length of the second array; and combine the first array and the second array to create an IQ baseband waveform data array. The IQ baseband waveform data array may be stored in the memory 151 by the waveform creator 151S as the CSV file 151SS. The IQ baseband waveform data array may be used to characterize the gain in a modulated signal, an error vector magnitude (EVM) in the modulated signal, and a group delay introduced by a DUT in the modulated signal. The IQ baseband waveform data array may be used with various wideband multi-tone modulated signals. As one example, the ability to characterize the gain in a modulated signal enables characterization of gain compression parameters such as the stimulus levels at which gain compression or phase compression or expansion occur. The IQ baseband waveform data array may be used to observe how a DUT behaves with or responds to an input signal or output signal that changes amplitude over time.

Figure 2A:
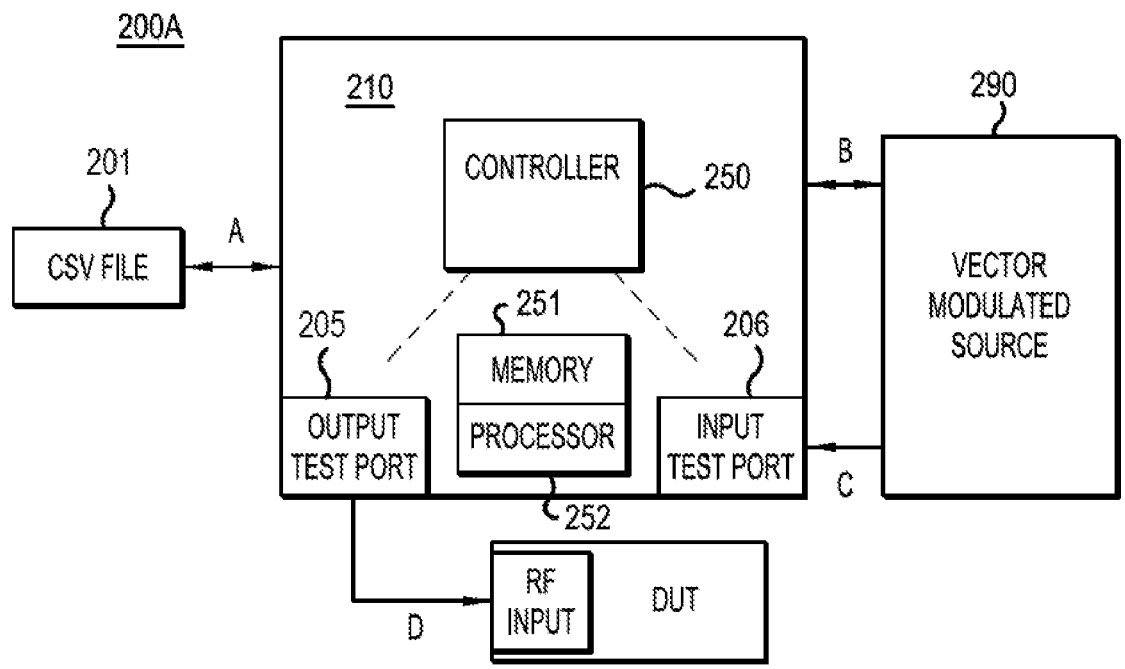
FIG. 2A illustrates another system for waveform creation for RF distortion analysis and gain compression characterization, in accordance with a representative embodiment.

FIG. 2A illustrates another system for waveform creation for RF distortion analysis and gain compression characterization, in accordance with a representative embodiment.

In FIG. 2A, a system 200A includes an analyzer 210 and a vector modulated source 290. The analyzer 210 includes an output test port 205, an input test port 206 and a controller 250. The controller 250 includes a memory 251 and a processor 252. The memory 251 stores instructions and the processor 252 executes the instructions. A CSV file 201 corresponds to the CSV file 151SS in FIG. 1, and is provided to the analyzer 210 after being created. The system 200A tests the DUT using the CSV file 201 and the vector modulated source 290. For example, the processor 252 may execute instructions to provide the CSV file 201 to the vector modulated source 290.

Figure 3:
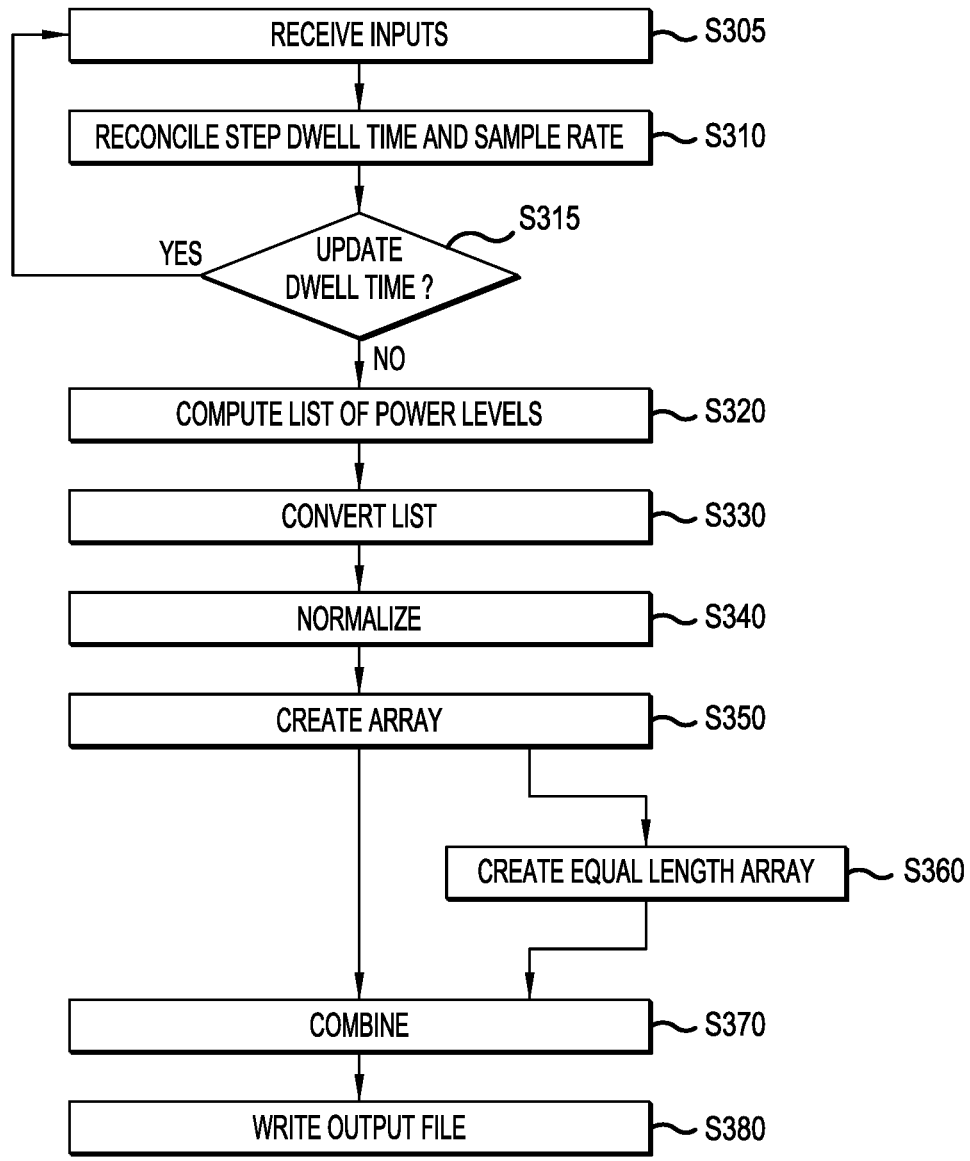
FIG. 3 illustrates a method for waveform creation for RF distortion analysis and gain compression characterization, in accordance with a representative embodiment.

The analyzer 210 is a signal analysis device such as a vector network analyzer (VNA) or similar type of signal analyzer or vector spectrum analyzer. In embodiments based on FIG. 2A, a DUT may be tested in a receiver mode by the analyzer 210. The CSV file 201 contains a baseband time domain IQ waveform with discrete power steps. FIG. 3 is described below as an example method for creating a baseband time domain IQ waveform. A spectrum analyzer application or a modulation distortion application stored in the memory 251 and executed by the processor 252 may process the CSV file 201 and provide the underlying baseband time domain IQ waveform to the vector modulated source 290. The vector modulated source 290 outputs a modulated RF signal based on the baseband time domain IQ waveform to the input test port 206 of the analyzer 210. The input test port 206 may be an element of a RF path. The output test port 205 then outputs the modulated RF signal based on the baseband time domain IQ waveform to the DUT. The DUT receives the modulated RF signal via a RF input.

The vector modulated source 290 may include a memory/processor combination to directly process the CSV file 201. The vector modulated source 290 interprets the waveform sample information in the IQ baseband waveform data array when the IQ baseband waveform data array is provided by the analyzer 210. As a result, the vector modulated source 290 provides a modulated RF signal to the analyzer 210 based on the IQ baseband waveform data array. The analyzer 210 may provide a user with prompts of selections of types of tones for the IQ baseband waveform data array, so that the IQ baseband waveform data array used for the modulated RF signal is based on a selection among options presented by the analyzer 210. In other words, the IQ baseband waveform data array which drives the vector modulated source 290 may be selected from multiple options presented by the analyzer 210.

In the embodiment of FIG. 2A, the analyzer 210 may provide source control and formatting to the vector modulated source 290. The analyzer 210 may also upload the underlying baseband time domain IQ waveform to the vector modulated source 290 for testing the DUT or individual components of the DUT such as a RF amplifier or a RF mixer.

Figure 2B:
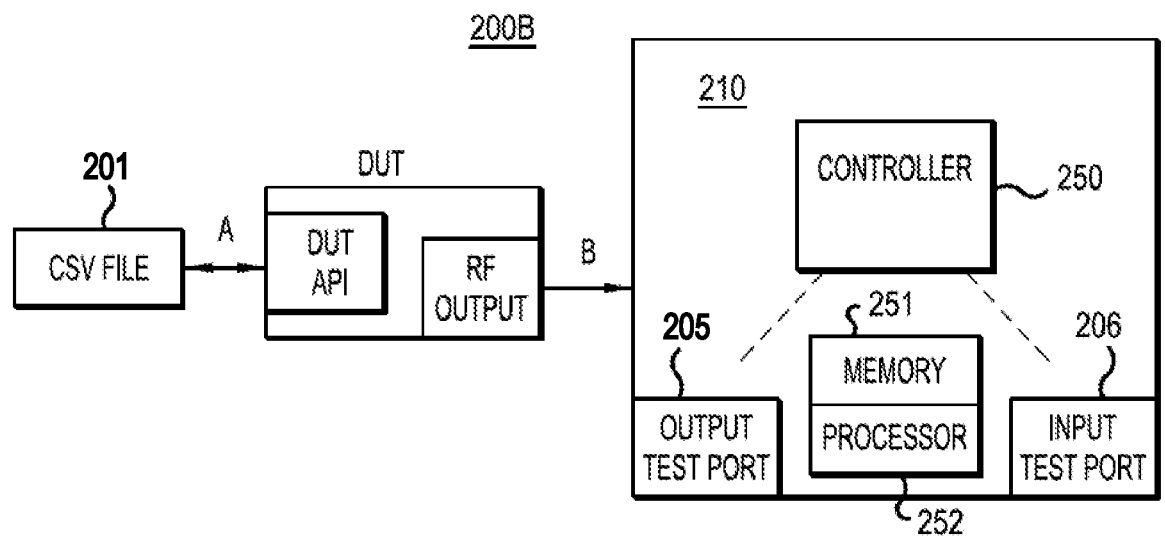
FIG. 2B illustrates another system for waveform creation for RF distortion analysis and gain compression characterization, in accordance with a representative embodiment.

FIG. 2B illustrates another system for waveform creation for RF distortion analysis and gain compression characterization, in accordance with a representative embodiment.

In FIG. 2B, a system 200B includes the analyzer 210 from FIG. 2A. The analyzer 210 includes an output test port 205, an input test port 206 and a controller 250. The controller 250 includes a memory 251 and a processor 252. The memory 251 stores instructions and the processor 252 executes the instructions. A CSV file 201 corresponds to the CSV file 15155 in FIG. 1, and is provided to a DUT after being created. The system 200B tests the DUT using the CSV file 202.

3. In embodiments based on FIG. 2B, a DUT may be tested in a transmitter mode by the analyzer 210. The CSV file 201 contains a baseband time domain IQ waveform with discrete power steps created by the method of FIG. 3 or a similar method. The CSV file is provided to the DUT via an application program interface (API) of the DUT, and the DUT outputs a modulated RF signal based on the baseband time domain IQ waveform to the analyzer 210 via a RF output.

The DUT in FIG. 2B interprets the waveform sample pairs (IQ waveform data) in the CSV file using a digital to analog converter (DAC) to convert the digital information to voltage levels. The DUT then upconverts the IQ waveform data from baseband to a desired RF frequency and outputs the RF signal. This process is similar or identical to how the vector source described earlier operates internally. The DUT interprets the IQ waveform data using the application programmable interface (API) available for the DUT. That is to say, the IQ baseband waveform data array is interpreted by the DUT's software API and hardware such that the DUT provides a modulated RF signal based on the IQ baseband waveform data array.

In FIG. 2B, the IQ baseband waveform data array is configured to be interpreted by the DUT such that the DUT provides a modulated RF signal to the analyzer 210 based on the IQ baseband waveform data array.

In FIG. 2A and FIG. 2B, a modulated RF signal based on the IQ baseband waveform data array is used by the analyzer 210 to characterize at least one of gain compression characteristics of the DUT or phase compression characteristics of the DUT. In FIG. 2A, the modulated RF signal is output by the vector modulated source 290, and in FIG. 2B the modulated RF signal is output by the DUT.

FIG. 3 illustrates a method for waveform creation for RF distortion analysis and gain compression characterization, in accordance with a representative embodiment.

The method of FIG. 3 may be performed by the system 100 including the controller 150. As an initial matter, in order to enable the measurement techniques described herein, a DUT is driven into compressed operating conditions. In traditional VNA measurement methodologies this can be done by changing the RF power amplitude at a given stimulus frequency. When using the existing measurement applications available on existing VNAs this may be handled automatically for the user by the application depending on the channel setup conditions. However, if the DUT is a cross-domain device such as a digital-RF receiver device, then traditional VNA measurement methodologies are not possible due to the lack of ability to continuously acquire and update the VNA with the DUT's acquired waveform that is responsive to the stimulus provided by the VNA. With the teachings herein, a suitable IQ waveform compatible with the coherent spectral analysis acquisition of the VNA can be calculated and this serves as a basis for the method of FIG. 3.

The method starts at S305 by receiving inputs. The inputs obtained at S305 may include a number of steps, a size of the steps, a duration of the steps, and a waveform sample rate. The number of steps may correspond to a count of discrete and differentiable horizontal levels of a waveform being created by the method in FIG. 3, whereas the size of the steps may correspond to the vertical difference between adjacent steps. A duration of the steps may correspond to a horizontal length of each of the steps. The algorithm to generate an IQ waveform usable to modulate an RF vector source under the conditions described herein uses the four inputs matching these conditions. The number of steps corresponds to the number of power levels desired. The desired change in RF power between levels corresponds to the size of the steps. The duration of the steps corresponds to the desired time to spend or dwell at each power level. These four pieces of information are requested from the user via entries displayed on the user interface in the waveform creator 1515 shown in FIG. 5, when the user selects to create the waveform type for power step continuous waveform tone. Using the desired inputs received from the user the power stepped continuous waveform tone IQ waveform is calculated in the method of FIG. 3 following FIG. 3.

Although not specified in FIG. 3, the system 100 may output a prompt of selection of types of tones for the IQ baseband waveform data array. The system 100 may obtain a selection of one of the types of tones for the IQ baseband waveform data array.

At S310, step dwell time is reconciled with the sample rate. The duration of the steps may be reconciled against the waveform sample rate to ensure a number of samples per step is an integer number.

At S315, a determination is made whether to update the dwell time based on the reconciliation at S310. The determination at S315 may involve confirming whether the number of samples per step is an integer number.

If the dwell time is to be updated (S315=Yes), the process returns to S305 to again receive inputs. In some embodiments, an updated duration of the steps may be provided when the number of samples per step is not an integer number, and updated inputs may be updated when the process returns to S305. The updated inputs may include an updated number of steps, an updated size of the steps, and an updated waveform sample rate.

If the dwell time is not to be updated (S315=No), at S320 a list of power levels is computed. The list of power levels is computed at S320 based on the number of steps and the size of the steps. The generation of the list of discrete amplitude levels for the IQ data pairs in the waveform may use a set of arbitrary power levels starting from 0 dBm and iteratively calculating the discrete levels based on the input total number of amplitude levels and step change magnitude. These two properties are obtained from the "Number of Levels" and "Power Step Size" entries shown in FIG. 5 below. For example, if the user enters values in the entries corresponding to 21 levels and a power step size of 1 dB, a list of power levels will be generated that will be a list of values 0, 1, 2, 3, . . . , 20 dBm. S320 may also include computing and appending to the list a set of decreasing power levels in a similar fashion as the set of increasing amplitude levels. However, the iterative loop for calculating the set of decreasing amplitudes may be adjusted slightly such that the calculation begins one discrete amplitude level down from the calculated stop, or maximum, amplitude level. The iterative loop for calculating the set of decreasing amplitudes may also stop calculating the discrete levels once a number of levels corresponding to one step before the minimum or starting amplitude level is reached. In some embodiments, the minimum and maximum power level are not repeated at the end or mid points, respectively, in the list to avoid continuously stimulating the DUT with an amplitude for twice as long at these amplitude points than the DUT experiences in time any other amplitude level. Thus, the final list of power computed at S320 may include the set of numerical values 0, 1, 2, 3, . . . , 20, 19, 18, 17, . . . , 1 dBm. The initial amplitude level of 0 dBm and units of dBm for this step in the algorithm are used as a mathematical convenience and do not correspond to the actual start and stop power levels that will be experienced by the DUT. These levels and the power range that is used to stimulate the DUT may be defined by the output amplitude setting of the RF source that will be modulated by the waveform created using the method of FIG. 3 at the time of measurement. The programmatic implementation of the method of FIG. 3 supports specifying specific start and stop powers and generating the levels based on that range by automatically adjusting the step size to accommodate the desired number of steps. Additionally, the waveform creator 1515 may communicate with or control an external vector RF source.

Additionally, S320 may include generating the individual time domain IQ samples that will make up the waveform. This is accomplished by first determining the number of samples required for each discrete amplitude level to achieve the set step dwell time. This value is obtained from the value specified in the "Dwell Time" entry in the user interface shown in FIG. 5. The number of samples for each discrete amplitude level is given by equation (1) as follows:

$$\text{LevelNumberOfSamples} = \text{StepDwellTime} * \text{WaveformSampleRate} \quad (1)$$

The product computed from equation (1) may be rounded to the nearest integer.

At S330, the list is converted. The list of power levels is converted at S330 to a list of voltage levels. The method of FIG. 3 includes using the list of discrete amplitude levels, in units of dBm, that was calculated previously and converting to discrete voltage levels. For example, a 50Ω characteristic impedance may be assumed when converting to the discrete voltage levels.

At S340, the converted list is normalized. The list of voltage levels is normalized so that the first array for I data is created based on scaled voltage values by repeating each scaled value a number of times required to achieve the duration of the steps given the waveform sample rate. Once the list of discrete voltage levels is calculated it is then normalized to the maximum voltage in the list, creating a list of values for the discrete values that will be used for the I portion of the IQ samples in the waveform.

At S350, an array is created. The array created at S350 may be a first array for I data, and may be created based on the voltage levels as normalized at S340. At S350, the method of FIG. 3 implemented using the waveform creator 1515 creates a new array for the I portion of the IQ samples by iterating through the list of individual I levels. The array may be created by repeating each value of a particular level in the array the number of times specified by the integer rounded result from Equation 1. The result of this is a first array that has all of the I value components for the IQ samples that make up the entire waveform.

At S360 an equal length array is created. The equal length array created at S360 may be a second array for Q data. The second array is created so that a length of the first array from S350 matches a length of the second array created at S360. An array of the Q component of the IQ sample for the waveform may be specified as 0.0 and the second array may be generated to be the same length as the I component array.

At S370, the array from S350 and the equal length array from S360 are combined. The combination of the first array from S350 and the second array from S360 results in creation of an IQ baseband waveform data array. The IQ baseband waveform data array may be created based on the selection of one of the types of tones for the IQ baseband waveform data array. The first array and the second array may be combined in the form of a list tuple data structures where each tuple element consists of two double values corresponding to the I components and Q components of the IQ sample in the waveform. At or after S370, the list of IQ samples may be formatted.

Figure 6A:
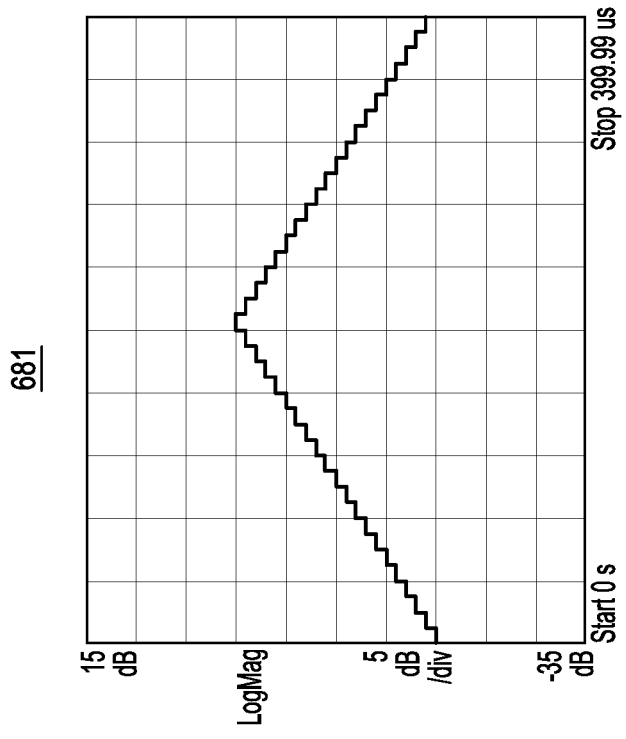
FIG. 6A illustrates a frequency domain representation of waveform created via a user interface for waveform creation for RF distortion analysis and gain compression characterization, in accordance with a representative embodiment.
Figure 6B:
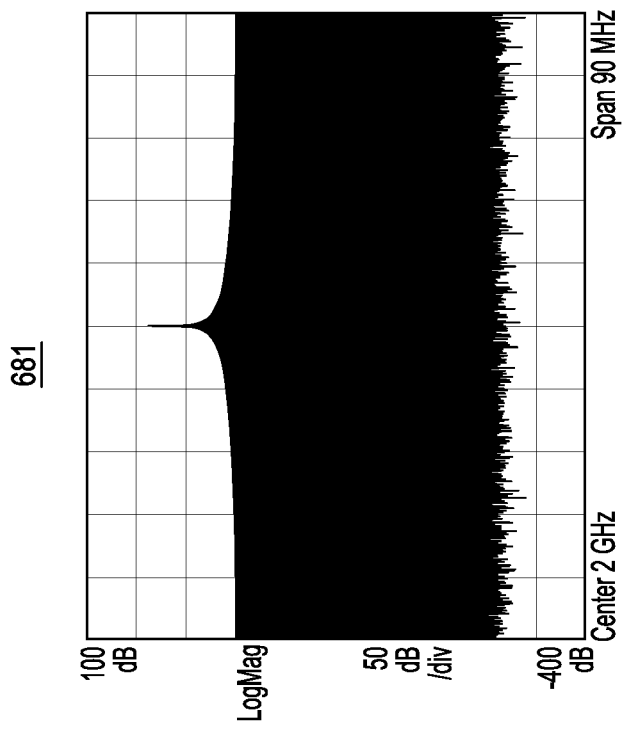
FIG. 6B illustrates a time domain representation of waveform created via a user interface for waveform creation for RF distortion analysis and gain compression characterization, in accordance with a representative embodiment.

At S380, an output file is written. The output file may be written as the CSV file 15155 in FIG. 1. The CSV file 15155 may be written for a VNA or a DUT based on the IQ baseband waveform data array and written to the disk or other permanent computer storage medium. The waveform may be formatted in CSV format so that the waveform can be displayed or modified by a basic text editor or spreadsheet program. Header information specific to enable use by a spectrum analyzer or modulation distortion application, such as the waveform sample rate, may be added to the header of the resulting CSV file. An example waveform showing the (a) time domain representation and (b) frequency domain representation of the waveform is shown in FIG. 6A and FIG. 6B.

The analyzer 210 in FIG. 2A or FIG. 2B is therefore enabled to interpret and playback a waveform using a source capable of vector modulation. That is, the IQ baseband waveform data array may be configured interpreted by a vector modulated source when provided by a vector network analyzer or similar device such that the vector modulated source provides a modulated RF signal to the vector network analyzer based on the IQ baseband waveform data array. The up conversion to the desired RF frequency is handled directly by the RF vector source. The DUT may be enabled to interpret and playback a waveform by itself. That is, the IQ baseband waveform data array is configured to be interpreted by the DUT such that the DUT provides a modulated RF signal to the vector network analyzer based on the IQ baseband waveform data array. The modulated RF signal based on the IQ baseband waveform data array is used by a vector network analyzer to characterize at least one of gain compression characteristics of a DUT or phase compression characteristics of the DUT.

The output CSV file may be written for a signal analysis device based on the IQ baseband waveform data array so that the signal analysis device can interpret and playback a waveform using a source capable of vector modulation. An example of a source capable of vector modulation is the vector modulated source 290 in FIG. 2A.

Notably, the IQ baseband waveform data array may be created in the method of FIG. 3 for testing a DUT with a digital interface and at least one of a RF input or a RF output. That is, the IQ baseband waveform data array may be created for testing a device under test (DUT) with cross-domain configurations including a digital interface and at least one of a RF input or a RF output. Such DUTs may have one or more RF input, one or more RF output, or both one or more RF input and one or more RF output. Such DUTs also have a digital interface which may include one or more digital input, one or more digital output, or both one or more digital input and one or more digital output. For example, the IQ baseband waveform data array may be created for testing digital-RF converting devices having a combination of a RF front end and a digital baseband back end. RF components and RF-digital cross domain receiver devices may be driven into compression, and the IQ baseband waveform data array enables characterization of such components and receiver devices in such conditions. For example, the IQ baseband waveform data array may be used to measure 1 dB gain compression and 0.5° phase compression points of a commercially available RF amplifier. The IQ baseband waveform data array may be configured to drive a RF amplifier or a RF mixer, either as stand-alone components or as components of DUTs. Digital-RF converting devices and digital-RF transceivers may therefore be tested using the IQ baseband waveform data array created by methods based on FIG. 3.

Figure 4:
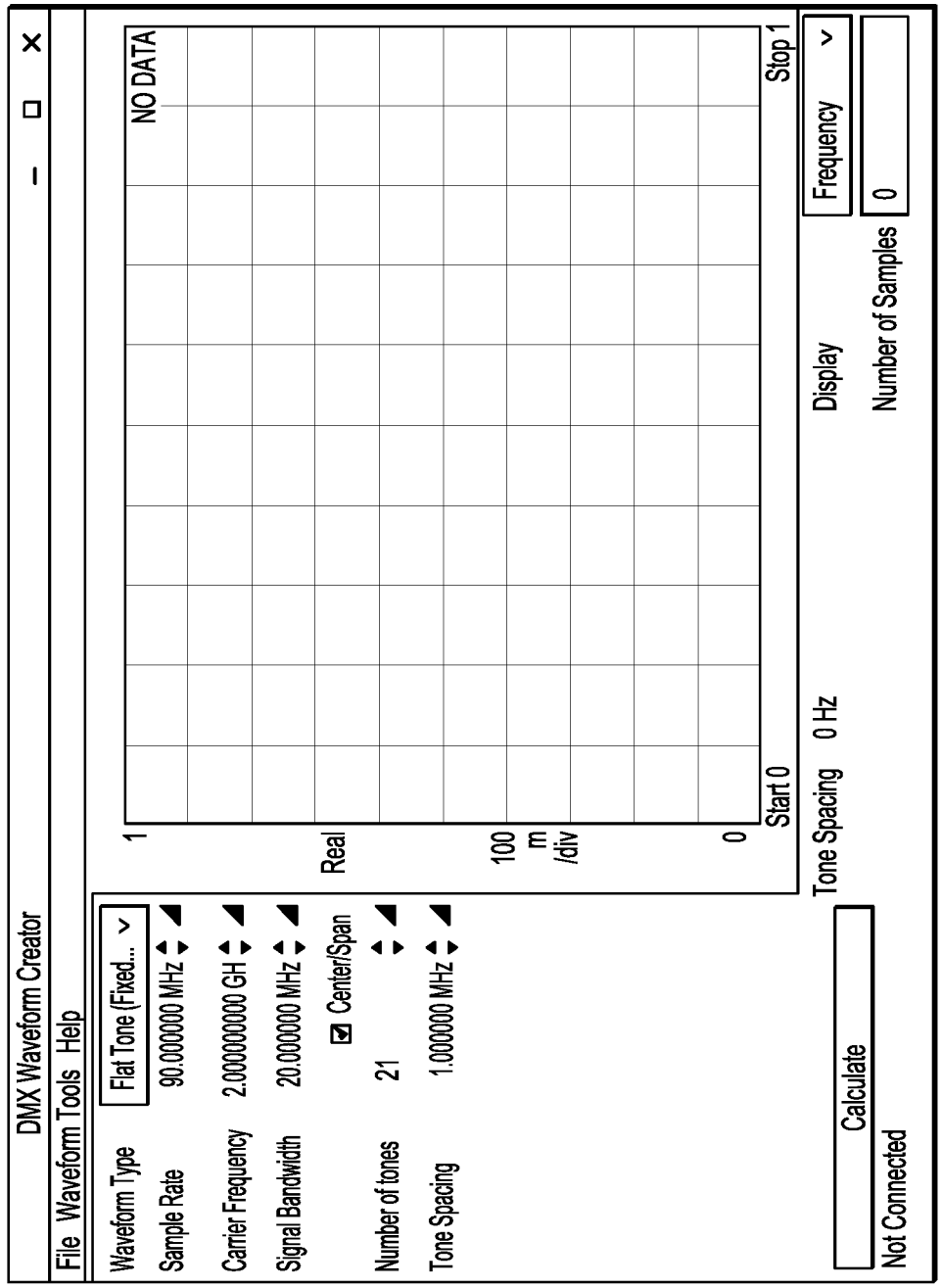
FIG. 4 illustrates a user interface for waveform creation for RF distortion analysis and gain compression characterization, in accordance with a representative embodiment.

FIG. 4 illustrates a user interface for waveform creation for RF distortion analysis and gain compression characterization, in accordance with a representative embodiment.

The user interface 481 in FIG. 4 may be an initial user interface for the waveform creator 1515 in FIG. 1. The user interface 481 may be displayed on the display 180 in FIG. 1. The user interface in FIG. 4 may be a default user interface that is displayed when the waveform creator 1515 in FIG. 1 is initially started up. The waveform creator 1515 may operate in two modes. A first mode may be a waveform creation and edit mode. This first mode may allow the user to select from multiple waveform creation types. For example, the first mode may allow the user to select from various waveform creation types such as flat tone (Fixed Phase); flat tone (Parabolic Phase), and power stepped (Continuous Waveform Tone).

When the power stepped CW Tone type waveform is selected, the entries in the user interface change to ones more appropriate for creating a power step like waveform. Specifically, the new entries that display are the number of levels, the dwell time per level, the power step size, and the power range desired.

Figure 5:
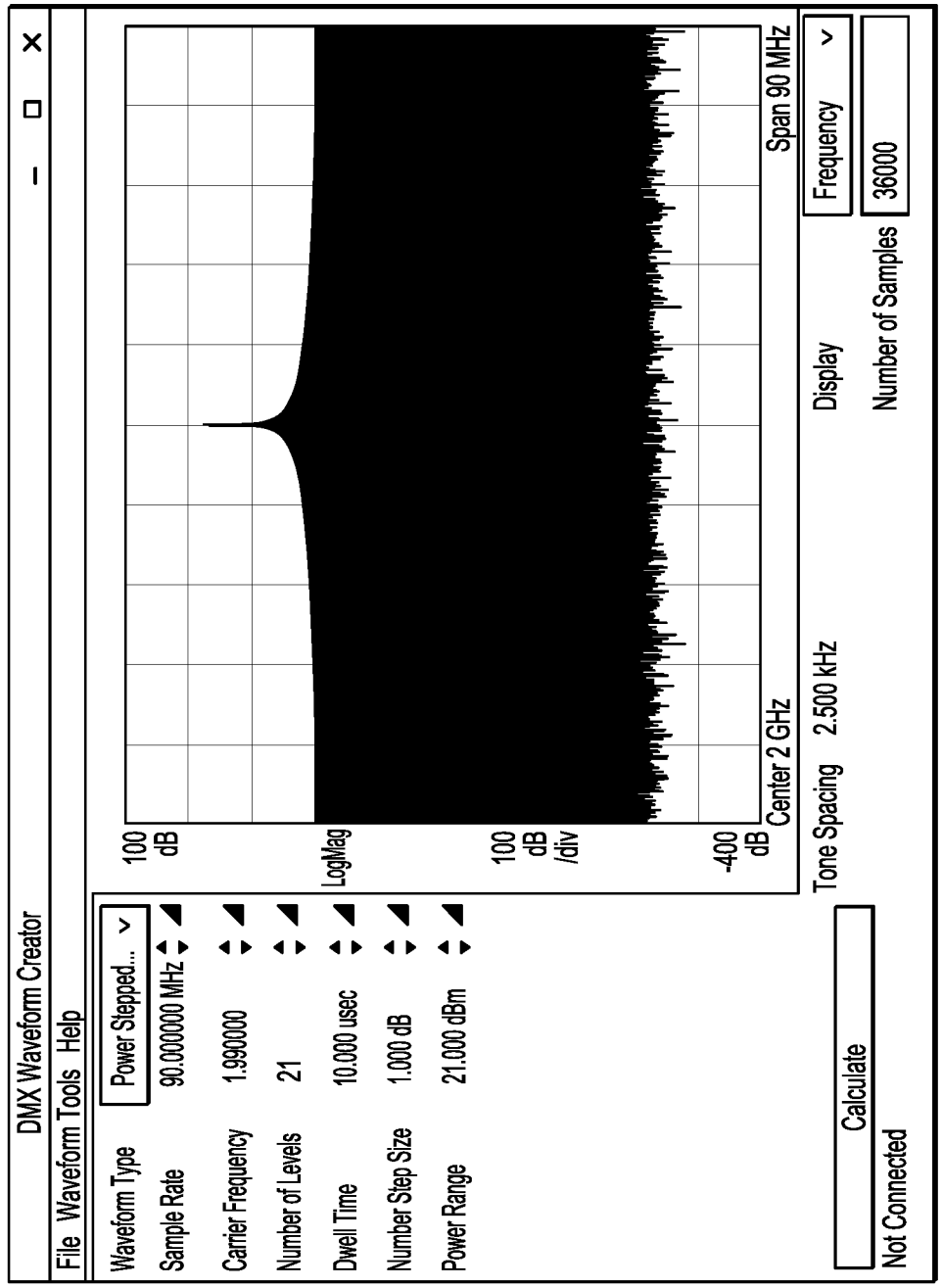
FIG. 5 illustrates a frequency domain representation of a waveform created via a user interface for waveform creation for RF distortion analysis and gain compression characterization, in accordance with a representative embodiment.

FIG. 5 illustrates a frequency domain representation of a waveform created via a user interface for waveform creation for RF distortion analysis and gain compression characterization, in accordance with a representative embodiment.

The user interface 581 in FIG. 5 may be a secondary user interface based on a selection of a choice in the user interface 481 in FIG. 4. The user interface 581 may be displayed on the display 180 in FIG. 1. The user interface 581 is for the waveform creator 1515 when the power stepped continuous waveform tone waveform type is selected is shown in FIG. 5. A user may select the power step continuous waveform generation type and, and the processor 152 may calculate a power step continuous waveform tone type waveform. The resulting waveform that is calculated has steps going up and then back down in power, forming a type of pyramid in amplitude when viewed in time domain. This waveform is ideally centered around the desired carrier frequency and may be considered as a single continuous waveform tone in frequency domain.

FIG. 6A illustrates a frequency domain representation of waveform created via a user interface for waveform creation for RF distortion analysis and gain compression characterization, in accordance with a representative embodiment. FIG. 6B illustrates a time domain representation of waveform created via a user interface for waveform creation for RF distortion analysis and gain compression characterization, in accordance with a representative embodiment.

The user interface 681 may be displayed on the display 180 in FIG. 1. An example time domain representation of a power stepped continuous waveform tone waveform generated using the waveform creator 1515 is shown in FIG. 6B next to the frequency domain representation of the same waveform shown in FIG. 6A. The representations in FIG. 6A and FIG. 6B may be shown simultaneously or individually. For the purposes of the waveform creator 1515, the carrier frequency information shown in FIG. 6A and FIG. 6B may be used for visual purposes only unless otherwise overridden by the user using a hidden application setting. No particular limits are placed on the power step size or the power range for the waveform as the resolution between power steps and power range possible may depend on each individual source that could be used and the waveform creator 1515 is agnostic to the RF vector source that will be used to play back the waveform. The waveform creator 1515 may serve in a mathematical computation capacity. The waveform in FIG. 6A and FIG. 6B may be created with 90 million samples per second sample rate, centered at a 2 Gigahertz (GHz) carrier frequency, with 21 levels, and 1 dB change in amplitude between steps, though these values are illustrative for an example waveform and the waveform creator 1515 may create waveforms with different carrier frequencies, numbers of levels, step sizes and other variables.

The entry for the number of levels is used to specify the number of "one-way" power levels that will be calculated for the overall power stepped continuous waveform tone waveform. The entry for the power step size is used to calculate the amplitude change in the IQ pair between the power levels. These two values are used in conjunction in calculating the value displayed in the power range entry. If the user adjusts the power range entry directly the power step size entry may be adjusted programmatically to remain consistent with the specified number of levels over the power range entered by the user. The dwell time specifies the length of time for each amplitude level requested in the waveform.

Once the various waveform parameters are provided by the user the waveform may be calculated by clicking the "Calculate" button available in the main window shown in the bottom left-hand corner of FIG. 4. The selection of "Power Stepped CW Tone" waveform type the waveform calculation and generation is handled internally by the DMX Waveform Creator software and does not require a connection to a Keysight VNA.

Figure 7A:
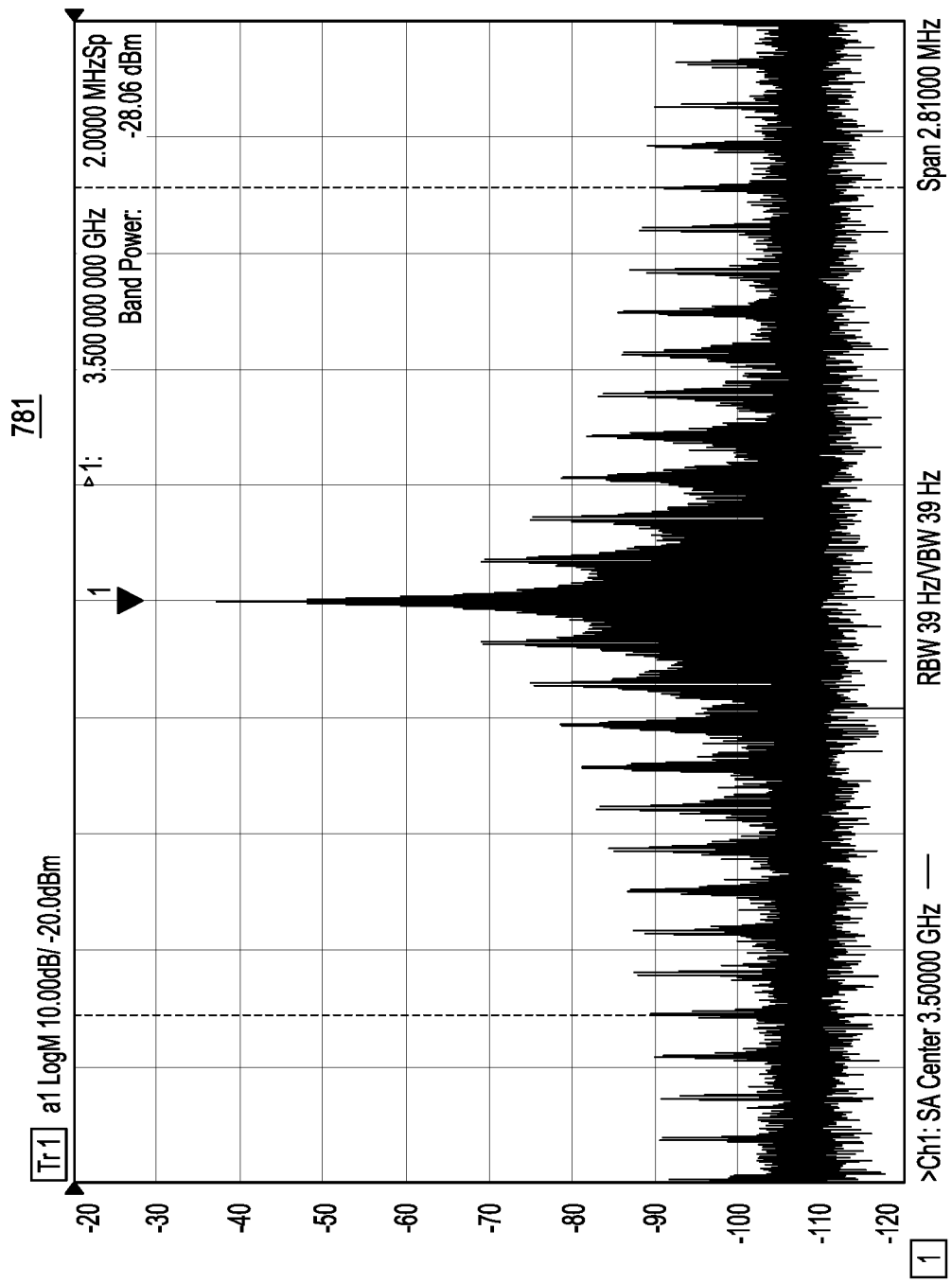
FIG. 7A illustrates an observed waveform created using RF vector source settings for a first carrier via a user interface for waveform creation for RF distortion analysis and gain compression characterization, in accordance with a representative embodiment.

FIG. 7A illustrates an observed waveform created using RF vector source settings for a first carrier via a user interface for waveform creation for RF distortion analysis and gain compression characterization, in accordance with a representative embodiment.

In FIG. 7A, RF vector source settings for a carrier are set at 3.5 GHz. The observed waveform results from modulating the RF vector source using the baseband power step CW tone IQ waveform.

Figure 7B:
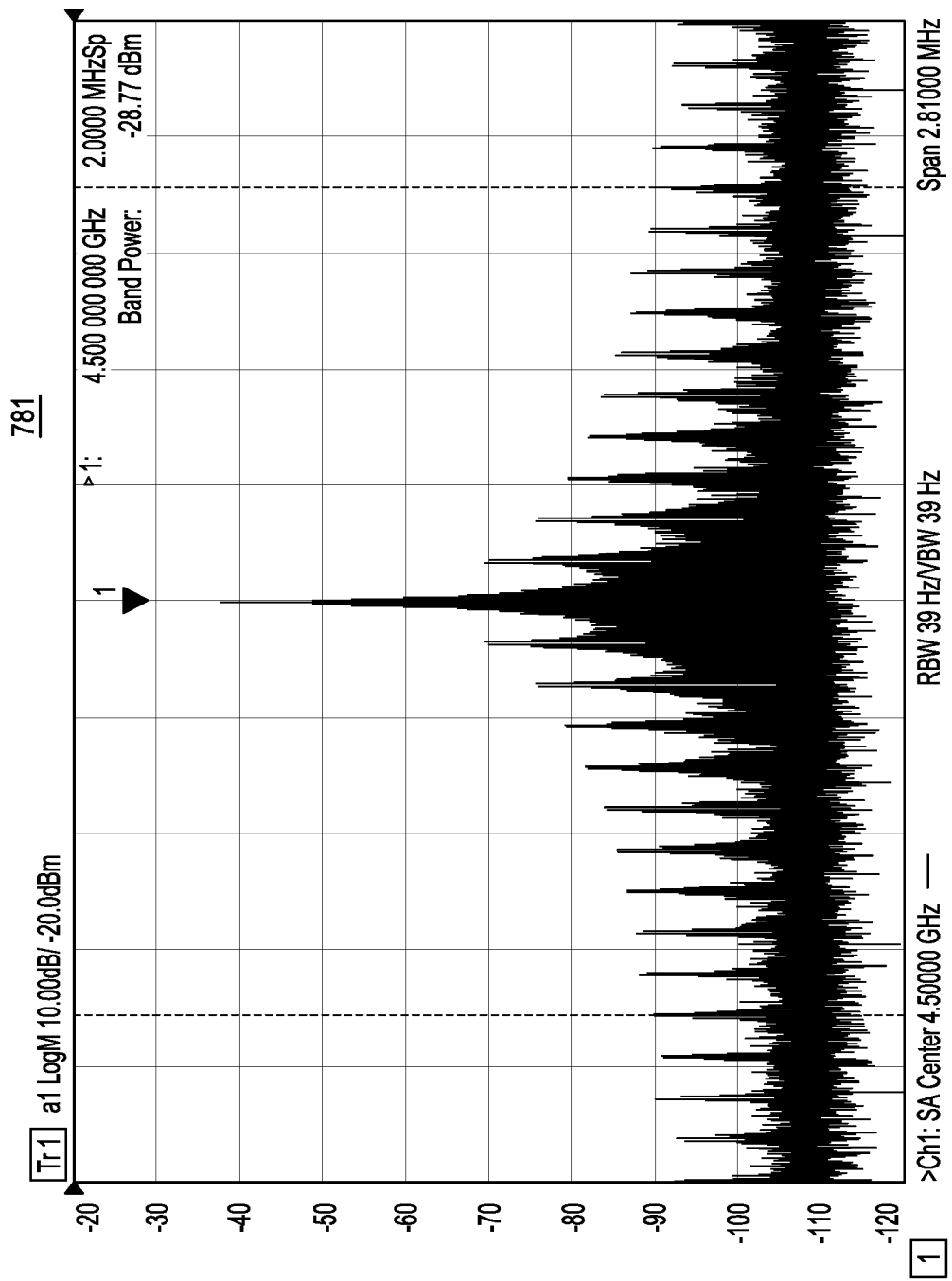
FIG. 7B illustrates an observed waveform created using RF vector source settings for a second carrier via a user interface for waveform creation for RF distortion analysis and gain compression characterization, in accordance with a representative embodiment.

FIG. 7B illustrates an observed waveform created using RF vector source settings for a second carrier via a user interface for waveform creation for RF distortion analysis and gain compression characterization, in accordance with a representative embodiment.

In FIG. 7B, RF vector source settings for a carrier are set at 4.5 GHz. The observed waveform results from modulating the RF vector source using the power step continuous wave tone IQ waveform.

Figure 7C:
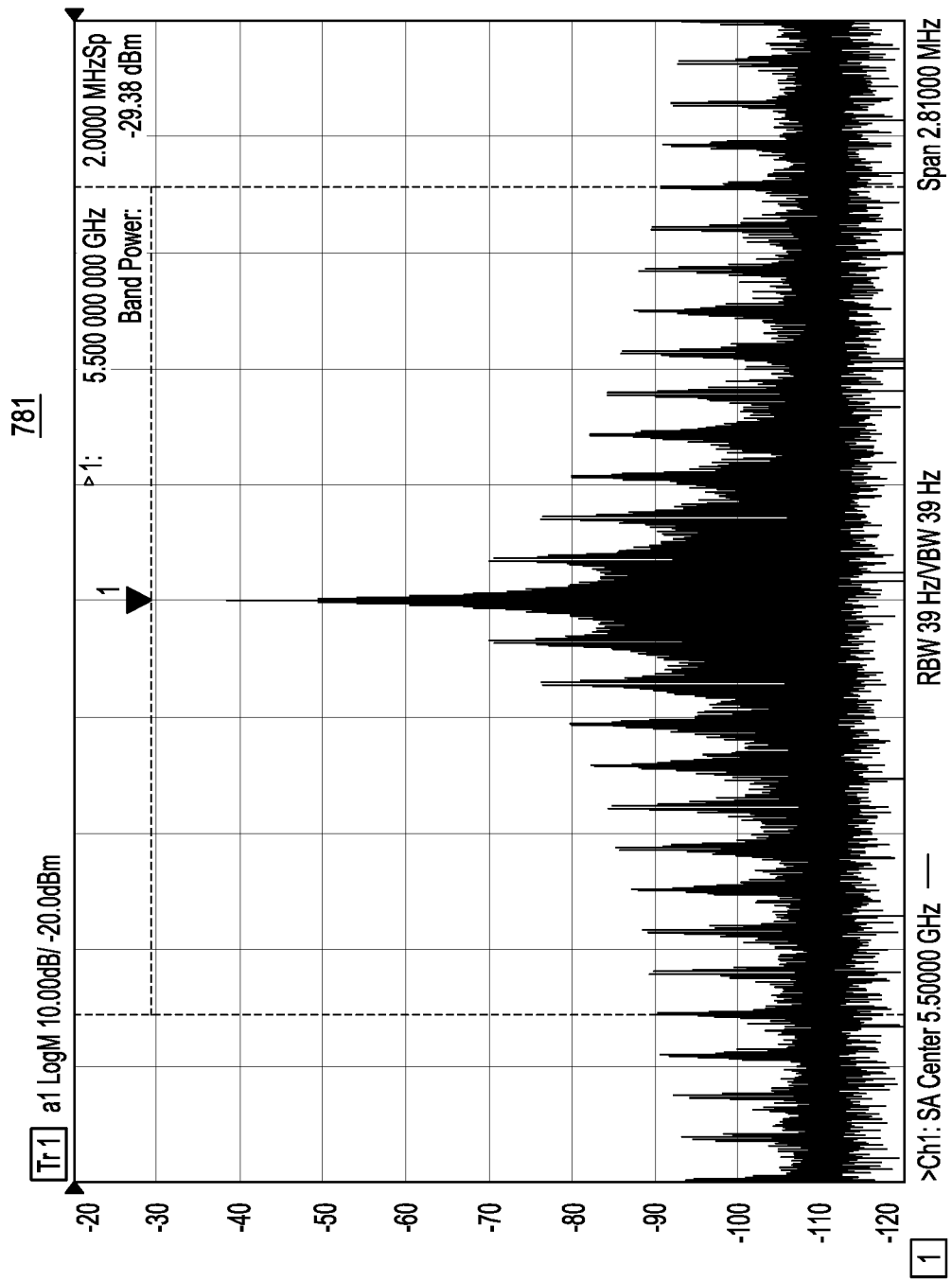
FIG. 7C illustrates an observed waveform created using RF vector source settings for a third carrier via a user interface for waveform creation for RF distortion analysis and gain compression characterization, in accordance with a representative embodiment.

FIG. 7C illustrates an observed waveform created using RF vector source settings for a third carrier via a user interface for waveform creation for RF distortion analysis and gain compression characterization, in accordance with a representative embodiment.

In FIG. 7C, RF vector source settings are set for a carrier at 5.5 GHz. The observed waveform results from modulating the RF vector source using the power step continuous waveform tone IQ waveform.

The user interface 781 shown in each of FIG. 7A, FIG. 7B and FIG. 7C may be displayed on the display 180 in FIG. 1. A VNA traditionally automatically controls the amplitude and frequency of the stimulus signal used in gain compression measurements. Utilization of the waveform described herein differs from this traditional approach in two ways. First, the created waveform only consists of baseband IQ data. The up conversion to the desired RF frequency is handled directly by the RF vector source. FIG. 7A, FIG. 7B and FIG. 7C illustrate the change in carrier frequency as a function of the carrier frequency setting on the RF source being modulated by the baseband IQ waveform shown in FIG. 6A and FIG. 6B. These observations of the carrier frequency are summarized in Table 1. The apparent 19 dB of difference in power from RF source setting and observation is due the losses from an internal combiner accounting for 12 dB of loss, an external power combiner required as part of the setup for a separate experiment not mentioned in this article accounting for 3 dB of loss, and 4 dB due to, presumably, cable and adapter loss as well as spectral spreading. The second difference is the start and stop stimulus amplitude levels.

Figure 8A:
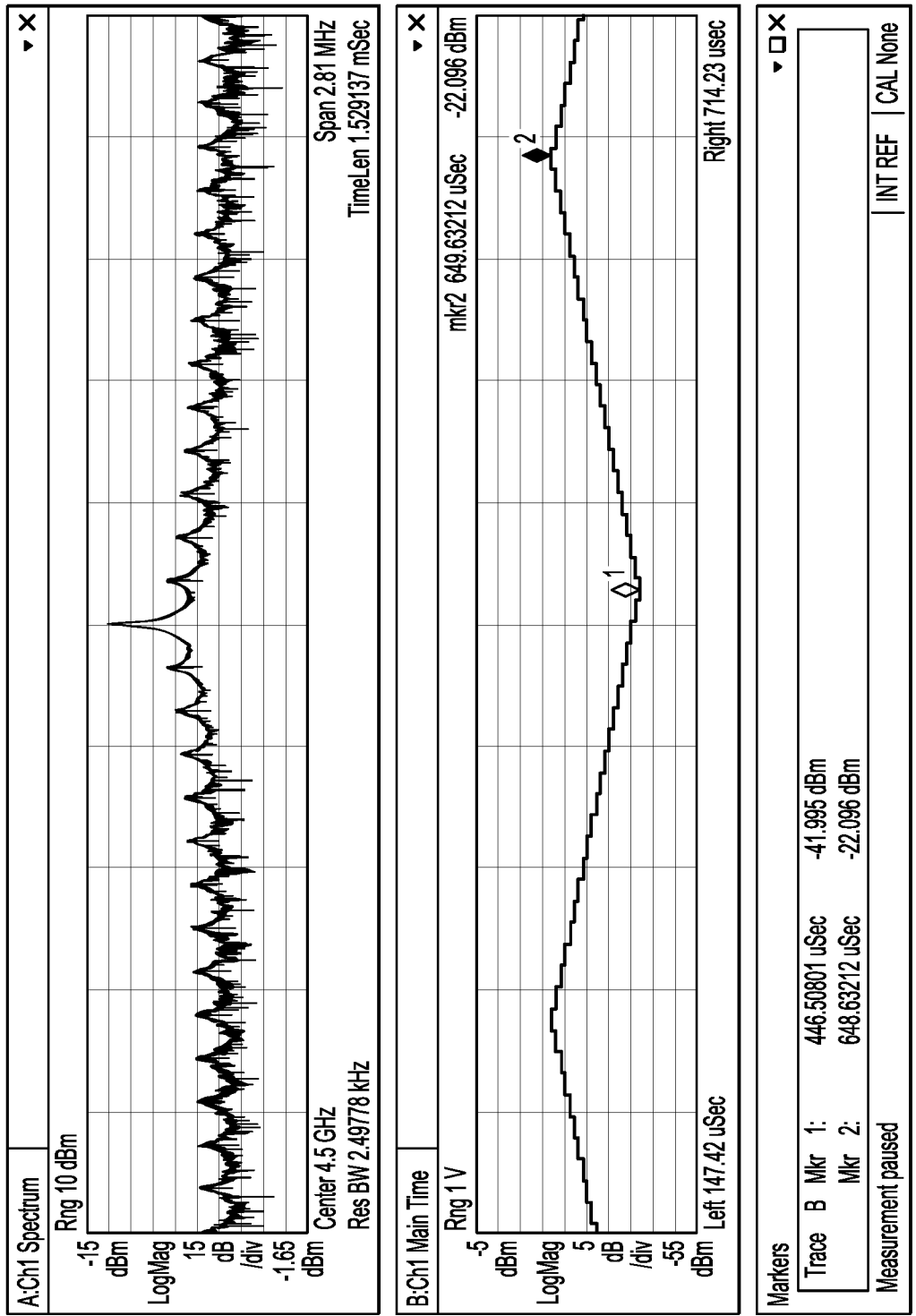
FIG. 8A illustrates observed start and stop power levels at a first RF source power setting on a user interface for waveform creation for RF distortion analysis and gain compression characterization, in accordance with a representative embodiment.
Figure 8B:
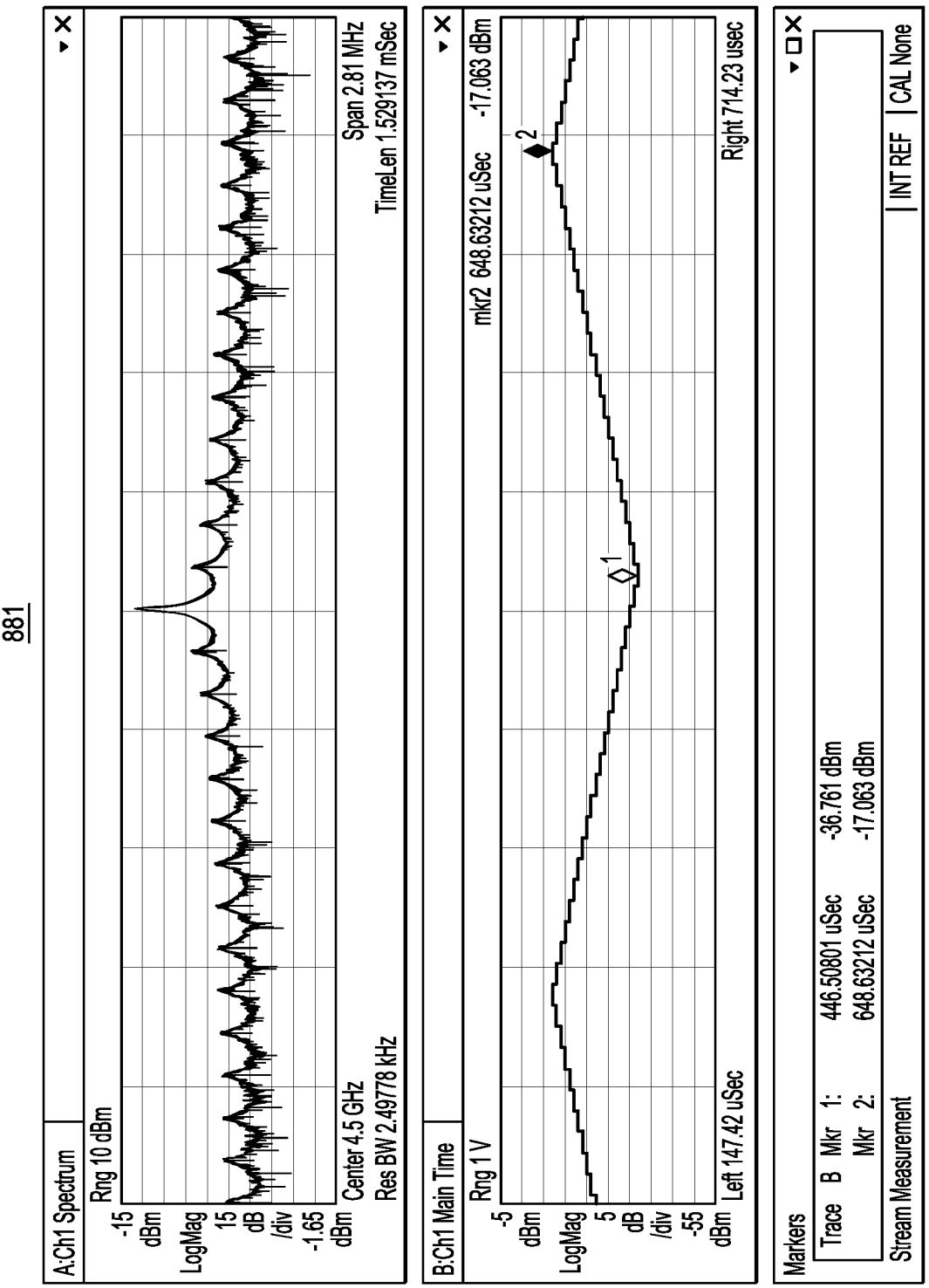
FIG. 8B illustrates observed start and stop power levels at a second RF source power setting on a user interface for waveform creation for RF distortion analysis and gain compression characterization, in accordance with a representative embodiment.

FIG. 8A illustrates observed start and stop power levels at a first RF source power setting on a user interface for waveform creation for RF distortion analysis and gain compression characterization, in accordance with a representative embodiment. FIG. 8B illustrates observed start and stop power levels at a second RF source power setting on a user interface for waveform creation for RF distortion analysis and gain compression characterization, in accordance with a representative embodiment.

The user interface 881 shown in each of FIG. 8A and FIG. 8B may be displayed on the display 180 in FIG. 1. In FIG. 8A, a RF source power is set to −10.0 dBm and the observed start and stop power levels when RF source is modulated using the baseband IQ power step CW tone waveform is shown. In FIG. 8B, a RF source power is set to −5.0 dBm and the observed start and stop power levels when RF source is modulated using the baseband IQ power step CW tone waveform is shown. The start and stop power levels may be controlled by changing the RF power level on the vector source being modulated with the IQ waveform. This source RF level corresponds to the integrated average power level of the waveform. FIG. 8A and FIG. 8B illustrate the change in start and stop levels as a function of the RF amplitude setting on the vector RF source being modulated with the same baseband IQ waveform shown in FIG. 6A and FIG. 6B.

In the observations shown in FIG. 8A and FIG. 8B, a source power calibration was not performed, so the system losses were not corrected.

Despite the uncompensated power losses, a difference of approximately 20 dB was shown in the observations summarized in Table 2, showing excellent agreement with the IQ waveform generated using the method of FIG. 3 and shown in FIG. 6A and FIG. 6B with 21 levels with a 1 dB change in amplitude between levels. Additionally, the change in RF power from setting to setting tracks with the 5 dB changes in output power requested of the RF source with 0.2 dB. The observations of the start and stop power levels as a function of the vector source power level are summarized in Table 2 below:

TABLE 2

| RF Source Carrier Frequency | RF Source Power Level Setting | Observed Start (Minimum) Power Level | Observed Stop (Maximum) Power Level | Observed Power Range |
| --- | --- | --- | --- | --- |
| 4.5 GHz | −10 dBm | −41.995 dBm | −22.096 dBm | 19.9 dB |
| 4.5 GHz | −5 dBm | −36.761 dBm | −17.063 dBm | 19.7 dB |
| 4.5 GHz | 0 dBm | −31.692 dBm | −11.915 dBm | 19.8 dB |

FIG. 9 illustrates a computer system, on which a method for waveform creation for RF distortion analysis and gain compression characterization is implemented, in accordance with another representative embodiment.

Referring to FIG. 9, the computer system 900 includes a set of software instructions that can be executed to cause the computer system 900 to perform any of the methods or computer-based functions disclosed herein. The computer system 900 may operate as a standalone device or may be connected, for example, using a network 901, to other computer systems or peripheral devices. In embodiments, a computer system 900 performs logical processing based on digital signals received via an analog-to-digital converter.

In a networked deployment, the computer system 900 operates in the capacity of a server or as a client user computer in a server-client user network environment, or as a peer computer system in a peer-to-peer (or distributed) network environment. The computer system 900 can also be implemented as or incorporated into various devices, such as a workstation that includes a controller, a stationary computer, a mobile computer, a personal computer (PC), a laptop computer, a tablet computer, or any other machine capable of executing a set of software instructions (sequential or otherwise) that specify actions to be taken by that machine. The computer system 900 can be incorporated as or in a device that in turn is in an integrated system that includes additional devices. In an embodiment, the computer system 900 can be implemented using electronic devices that provide voice, video or data communication. Further, while the computer system 900 is illustrated in the singular, the term "system" shall also be taken to include any collection of systems or sub-systems that individually or jointly execute a set, or multiple sets, of software instructions to perform one or more computer functions.

As illustrated in FIG. 9, the computer system 900 includes a processor 910. The processor 910 may be considered a representative example of a processor of a controller and executes instructions to implement some or all aspects of methods and processes described herein. The processor 910 is tangible and non-transitory. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The processor 910 is an article of manufacture and/or a machine component. The processor 910 is configured to execute software instructions to perform functions as described in the various embodiments herein. The processor 910 may be a general-purpose processor or may be part of an application specific integrated circuit (ASIC). The processor 910 may also be a microprocessor, a microcomputer, a processor chip, a controller, a microcontroller, a digital signal processor (DSP), a state machine, or a programmable logic device. The processor 910 may also be a logical circuit, including a programmable gate array (PGA), such as a field programmable gate array (FPGA), or another type of circuit that includes discrete gate and/or transistor logic. The processor 910 may be a central processing unit (CPU), a graphics processing unit (GPU), or both. Additionally, any processor described herein may include multiple processors, parallel processors, or both. Multiple processors may be included in, or coupled to, a single device or multiple devices.

The term "processor" as used herein encompasses an electronic component able to execute a program or machine executable instruction. References to a computing device comprising "a processor" should be interpreted to include more than one processor or processing core, as in a multi-core processor. A processor may also refer to a collection of processors within a single computer system or distributed among multiple computer systems. The term computing device should also be interpreted to include a collection or network of computing devices each including a processor or processors. Programs have software instructions performed by one or multiple processors that may be within the same computing device or which may be distributed across multiple computing devices.

The computer system 900 further includes a main memory 920 and a static memory 930, where memories in the computer system 900 communicate with each other and the processor 910 via a bus 908. Either or both of the main memory 920 and the static memory 930 may be considered representative examples of a memory of a controller, and store instructions used to implement some or all aspects of methods and processes described herein. Memories described herein are tangible storage mediums for storing data and executable software instructions and are non-transitory during the time software instructions are stored therein. As used herein, the term "non-transitory" is to be interpreted not as an eternal characteristic of a state, but as a characteristic of a state that will last for a period. The term "non-transitory" specifically disavows fleeting characteristics such as characteristics of a carrier wave or signal or other forms that exist only transitorily in any place at any time. The main memory 920 and the static memory 930 are articles of manufacture and/or machine components. The main memory 920 and the static memory 930 are computer-readable mediums from which data and executable software instructions can be read by a computer (e.g., the processor 910). Each of the main memory 920 and the static memory 930 may be implemented as one or more of random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. The memories may be volatile or non-volatile, secure and/or encrypted, unsecure and/or unencrypted.

"Memory" is an example of a computer-readable storage medium. Computer memory is any memory which is directly accessible to a processor. Examples of computer memory include, but are not limited to RAM memory, registers, and register files. References to "computer memory" or "memory" should be interpreted as possibly being multiple memories. The memory may for instance be multiple memories within the same computer system. The memory may also be multiple memories distributed amongst multiple computer systems or computing devices.

As shown, the computer system 900 further includes a video display unit 950, such as a liquid crystal display (LCD), an organic light emitting diode (OLED), a flat panel display, a solid-state display, or a cathode ray tube (CRT), for example. Additionally, the computer system 900 includes an input device 960, such as a keyboard/virtual keyboard or touch-sensitive input screen or speech input with speech recognition, and a cursor control device 970, such as a mouse or touch-sensitive input screen or pad. The computer system 900 also optionally includes a disk drive unit 980, a signal generation device 990, such as a speaker or remote control, and/or a network interface device 940.

In an embodiment, as depicted in FIG. 9, the disk drive unit 980 includes a computer-readable medium 982 in which one or more sets of software instructions 984 (software) are embedded. The sets of software instructions 984 are read from the computer-readable medium 982 to be executed by the processor 910. Further, the software instructions 984, when executed by the processor 910, perform one or more steps of the methods and processes as described herein. In an embodiment, the software instructions 984 reside all or in part within the main memory 920, the static memory 930 and/or the processor 910 during execution by the computer system 900. Further, the computer-readable medium 982 may include software instructions 984 or receive and execute software instructions 984 responsive to a propagated signal, so that a device connected to a network 901 communicates voice, video or data over the network 901. The software instructions 984 may be transmitted or received over the network 901 via the network interface device 940.

In an embodiment, dedicated hardware implementations, such as application-specific integrated circuits (ASICs), field programmable gate arrays (FPGAs), programmable logic arrays and other hardware components, are constructed to implement one or more of the methods described herein. One or more embodiments described herein may implement functions using two or more specific interconnected hardware modules or devices with related control and data signals that can be communicated between and through the modules. Accordingly, the present disclosure encompasses software, firmware, and hardware implementations. Nothing in the present application should be interpreted as being implemented or implementable solely with software and not hardware such as a tangible non-transitory processor and/or memory.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing may implement one or more of the methods or functionalities as described herein, and a processor described herein may be used to support a virtual processing environment.

Accordingly, waveform creation for RF distortion analysis and gain compression characterization enables characterization of behavior exhibited by digital-RF converting devices and digital-RF transceivers with RF components and digital interfaces.

Although waveform creation for RF distortion analysis and gain compression characterization has been described with reference to several exemplary embodiments, it is understood that the words that have been used are words of description and illustration, rather than words of limitation. Changes may be made within the purview of the appended claims, as presently stated and as amended, without departing from the scope and spirit of waveform creation for RF distortion analysis and gain compression characterization in its aspects. Although waveform creation for RF distortion analysis and gain compression characterization has been described with reference to particular means, materials and embodiments, waveform creation for RF distortion analysis and gain compression characterization is not intended to be limited to the particulars disclosed; rather waveform creation for RF distortion analysis and gain compression characterization extends to all functionally equivalent structures, methods, and uses such as are within the scope of the appended claims.

The illustrations of the embodiments described herein are intended to provide a general understanding of the structure of the various embodiments. The illustrations are not intended to serve as a complete description of all of the elements and features of the disclosure described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The preceding description of the disclosed embodiments is provided to enable any person skilled in the art to practice the concepts described in the present disclosure. As such, the above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

The invention claimed is:

1. A system, comprising:
a memory that stores instructions; and
a processor that executes the instructions, wherein, when executed by the processor, the instructions cause the system to:
obtain inputs including a number of steps, a size of the steps, a duration of the steps, and a waveform sample rate;
reconcile the duration of the steps against the waveform sample rate to ensure a number of samples per step is an integer number;
compute a list of power levels based on the number of steps and the size of the steps;
convert the list of power levels to a list of voltage levels;
create a first array for I data based on the voltage levels;
create a second array for Q data so that a length of the first array matches a length of the second array; and
combine the first array and the second array to create an IQ baseband waveform data array, wherein a modulated radio frequency signal based on the IQ baseband waveform data array is used by a signal analysis device to characterize at least one of gain compression characteristics of a device under test or phase compression characteristics of a device under test.

2. The system of claim 1, wherein, when executed by the processor, the instructions further cause the system to:
provide an updated duration of the steps when the number of samples per step is not an integer number; and
obtain updated inputs including an updated number of steps, an updated size of the steps, and an updated waveform sample rate.

3. The system of claim 1, wherein, when executed by the processor, the instructions further cause the system to:
normalize the list of voltage levels so that the first array for I data is created based on scaled voltage values by repeating each scaled value a number of times required to achieve the duration of the steps given the waveform sample rate.

4. The system of claim 1, wherein, when executed by the processor, the instructions further cause the system to:
write an output CSV file for a signal analysis device based on the IQ baseband waveform data array so that the signal analysis device can interpret and playback a waveform using a source capable of vector modulation.

5. The system of claim 1, wherein the IQ baseband waveform data array is created for testing a device under test with a digital interface and at least one of a radio frequency input or a radio frequency output.

6. The system of claim 1, wherein the IQ baseband waveform data array is configured to drive at least one of a radio frequency amplifier or a radio frequency mixer.

7. The system of claim 1, wherein the IQ baseband waveform data array is configured to drive a vector modulated source when provided by a signal analysis device such that the vector modulated source provides a modulated radio frequency signal to the signal analysis device based on the IQ baseband waveform data array.

8. The system of claim 1, wherein the IQ baseband waveform data array is configured to drive a device under test such that the device under test provides a modulated radio frequency signal to a signal analysis device based on the IQ baseband waveform data array.

9. The system of claim 1, wherein a modulated radio frequency signal based on the IQ baseband waveform data array is used by a signal analysis device to characterize at least one of gain compression characteristics of a device under test or phase compression characteristics of a device under test.

10. The system of claim 1, wherein, when executed by the processor, the instructions further cause the system to:
  output a prompt of selection of types of tones for the IQ baseband waveform data array;
  obtain a section of one of the types of tones for the IQ baseband waveform data array; and
  create the IQ baseband waveform data array based on the selection.

11. A method performed by a system comprising a memory that stores instructions and a processor that executes the instructions, the method comprising:
  receiving inputs including a number of steps, a size of the steps, a duration of the steps, and a waveform sample rate;
  reconciling the duration of the steps against the waveform sample rate to ensure a number of samples per step is an integer number;
  computing a list of power levels based on the number of steps and the size of the steps;
  converting the list of power levels to a list of voltage levels;
  creating a first array for I data based on the voltage levels;
  creating a second array for Q data so that a length of the first array matches a length of the second array; and
  combining the first array and the second array to create an IQ baseband waveform data array, wherein a modulated radio frequency signal based on the IQ baseband waveform data array is used by a signal analysis device to characterize at least one of gain compression characteristics of a device under test or phase compression characteristics of a device under test.

12. The method of claim 11, further comprising:
  providing an updated duration of the steps when the number of samples per step is not an integer number; and
  receiving updated inputs including the number of steps, the size of the steps, the duration of the steps, and the waveform sample rate.

13. The method of claim 11, further comprising:
  normalizing the list of voltage levels so that the first array for I data is created based on scaled voltage values by repeating each scaled value a number of times required to achieve the duration of the steps given the waveform sample rate.

14. The method of claim 11, further comprising:
  writing an output CSV file for a signal analysis device based on the IQ baseband waveform data array so that the signal analysis device can interpret and playback a waveform using a source capable of vector modulation.

15. The method of claim 11, wherein the IQ baseband waveform data array is created for testing a device under test with a digital interface and at least one of a radio frequency input or a radio frequency output.

16. The method of claim 11, wherein the IQ baseband waveform data array is configured to drive at least one of a radio frequency amplifier or a radio frequency mixer.

17. The method of claim 11, wherein the IQ baseband waveform data array is configured to drive a vector modulated source when provided by a signal analysis device such that the vector modulated source provides a modulated radio frequency signal to the signal analysis device based on the IQ baseband waveform data array.

18. The method of claim 11, wherein the IQ baseband waveform data array is configured to drive a device under test such that the device under test provides a modulated radio frequency signal to a signal analysis device based on the IQ baseband waveform data array.

19. The method of claim 11, the method further comprising:
  outputting a prompt of selection of types of tones for the IQ baseband waveform data array;
  obtaining a section of one of the types of tones for the IQ baseband waveform data array; and
  creating the IQ baseband waveform data array based on the selection.

* * * * *